Patented May 11, 1926.

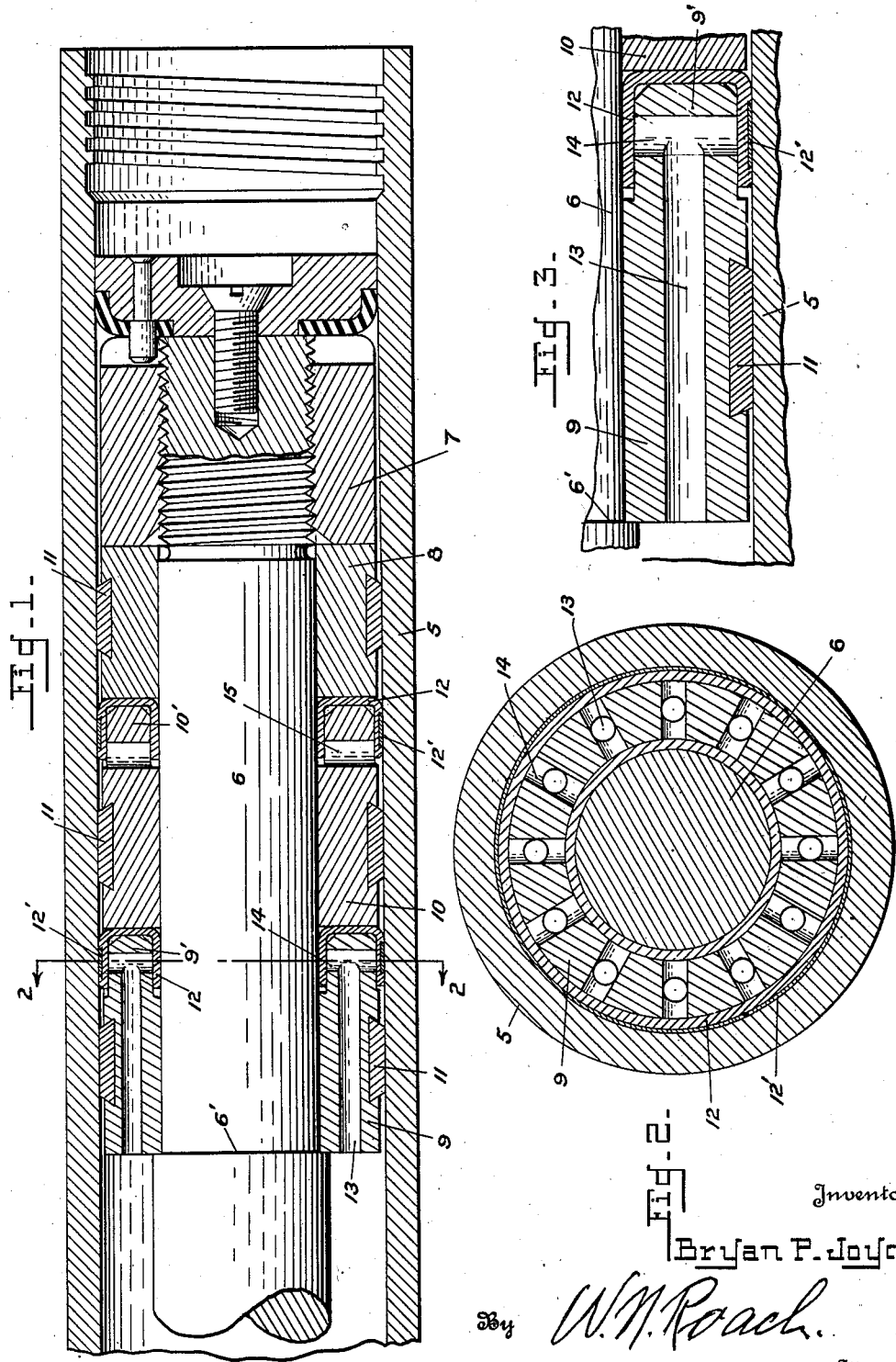

UNITED STATES PATENT OFFICE.

BRYAN P. JOYCE, OF DAVENPORT, IOWA.

METALLIC PACKING.

Application filed June 8, 1925. Serial No. 35,794.

This invention relates to a metallic packing.

In the employment of cup rings for the purpose of sealing fluid chambers the pressure of the confined fluid is directed to expand the ring and hold it in close contact with its surrounding walls. Where the cup ring is made of comparatively soft metal it will, unless properly supported, be quickly deformed and hammered out under the pressure of the fluid and due to the impact of its sustaining parts.

The principal object of the present invention then, is to provide a packing assembly in which a cup ring of soft metal and subject to the pressure of the confined fluid is so designed and assembled with respect to its sustaining members that an effectual seal will be provided without distortion of the packing.

To these and other ends, my invention consists in the construction, arrangement, and combination of elements described hereinafter and pointed out in the claims forming a part of this specification.

A practical embodiment of the invention is illustrated in the accompanying drawings, wherein:

Fig. 1 is a longitudinal sectional view through a packing assembly constructed in accordance with the invention;

Fig. 2 is a sectional view on the line 2—2 of Fig. 1; and

Fig. 3 is a fragmentary enlarged sectional view of the inner rings shown in Fig. 1.

Referring to the drawings by numerals of reference:

The packing forming the subject matter of this invention may be used either for stationary or moving joints and is designed to be assembled in place as a unit. In the application of the packing there is shown a cylindrical casing 5 constituting a fluid chamber in which is reciprocally mounted a piston 6 having a piston head made up of the improved packing assembly and confined between a shoulder 6' on the piston and an end nut 7.

The packing assembly consists of an outer metallic ring 8, an inner ring 9, and an intermediate ring 10, all of which are spaced from the wall of the casing and provided with anti-friction bands 11 for centering the piston. The corresponding end portions of both the inner and intermediate rings are each reduced as at 9' and 10' to exactly fit into identical cup rings 12, made of a comparatively soft and ductile metal such as silver, and seated on the inner face of the succeeding metallic ring. The shells of the cup rings are thus rigidly supported and held in close contact with the surrounding walls so that they will not become deformed in operation. The cup rings are formed with a flat base so as to present a bearing surface of maximum area to sustain the pressure exerted by the metallic rings without becoming malleated. The shells of the cup rings are perpendicular to the base to provide a broad contact surface against both the piston and the casing. The outer shell carries a band 12' of a ductile metal, such as tin.

The inner ring 9 on the fluid side of the packing is provided with a series of longitudinal ducts 13 each intersected by a transverse duct 14 positioned to direct the pressure fluid against the approximate center of the shells of the cup ring to hold the same in close contact with the surrounding walls. This arrangement in conjunction with the close supporting fit of the reduced end 9' of the ring with the shells provides an effective seal to confine the pressure fluid, only sufficient leakage occurring to lubricate the forward portion of the packing assembly.

The intermediate metallic ring 10 which also carries a cup ring on its outer end is provided with spaced transverse ducts 15 disposed partially above the rim of the cup ring and serving to equalize the pressure within said ring.

I claim:

1. In combination with a casing and a reciprocal member mounted therein, a plurality of metallic rings embracing said member, cup rings fitted on the corresponding ends of the inner and intermediate rings and seating against the succeeding ring, the inner ring provided with a series of longitudinal ducts and intersecting transverse ducts for directing a pressure medium against the approximate center of the shells of the cup ring, and the intermediate ring provided with transverse ducts disposed partially above the rim on its cup ring to equalize the pressure within said cup ring.

2. A packing for sealing pressure fluids embodying a series of metallic rings, the inner ring formed with a reduced end, a cup ring fitted on said end and seated against the succeeding ring, said cup ring formed with a flat base and with shells perpendicular thereto and the inner ring provided with a series of longitudinal ducts and intersecting transverse ducts for directing the pressure fluid against the approximate centers of the shells.

3. A packing for sealing pressure fluids embodying a series of metallic rings, the inner ring formed with a reduced end, a cup ring fitted on said end and seated against the succeeding ring, said cup ring formed with a flat base and with shells perpendicular thereto and the inner ring provided with means for directing the pressure fluid against the approximate centers of the shells.

4. A packing for sealing pressure fluids embodying a series of metallic rings, a cup ring fitted on the end of an intermediate ring and seated on the succeeding ring, and said intermediate ring provided with transverse ducts disposed partially above the rim of the cup ring for equalizing the pressure of the fluid within the cup ring.

5. A packing for sealing pressure fluids, embodying a metallic ring formed with a reduced end, a cup ring closely fitting on the reduced end, means for sustaining the cup ring, and said metallic ring provided with means for directing the pressure fluid against the approximate center of the shells of the cup ring.

6. A packing for sealing pressure fluids embodying a metallic ring formed with a reduced end, a cup ring closely fitting on the reduced end, means for sustaining the cup ring and said metallic ring provided with transverse ducts disposed partially above the rim of the cup ring for equalizing the pressure of the fluid within the cup ring.

BRYAN P. JOYCE.